Dec. 5, 1933.  W. C. SHINN  1,937,848
LOCK FOR NUTS
Filed Oct. 26, 1931
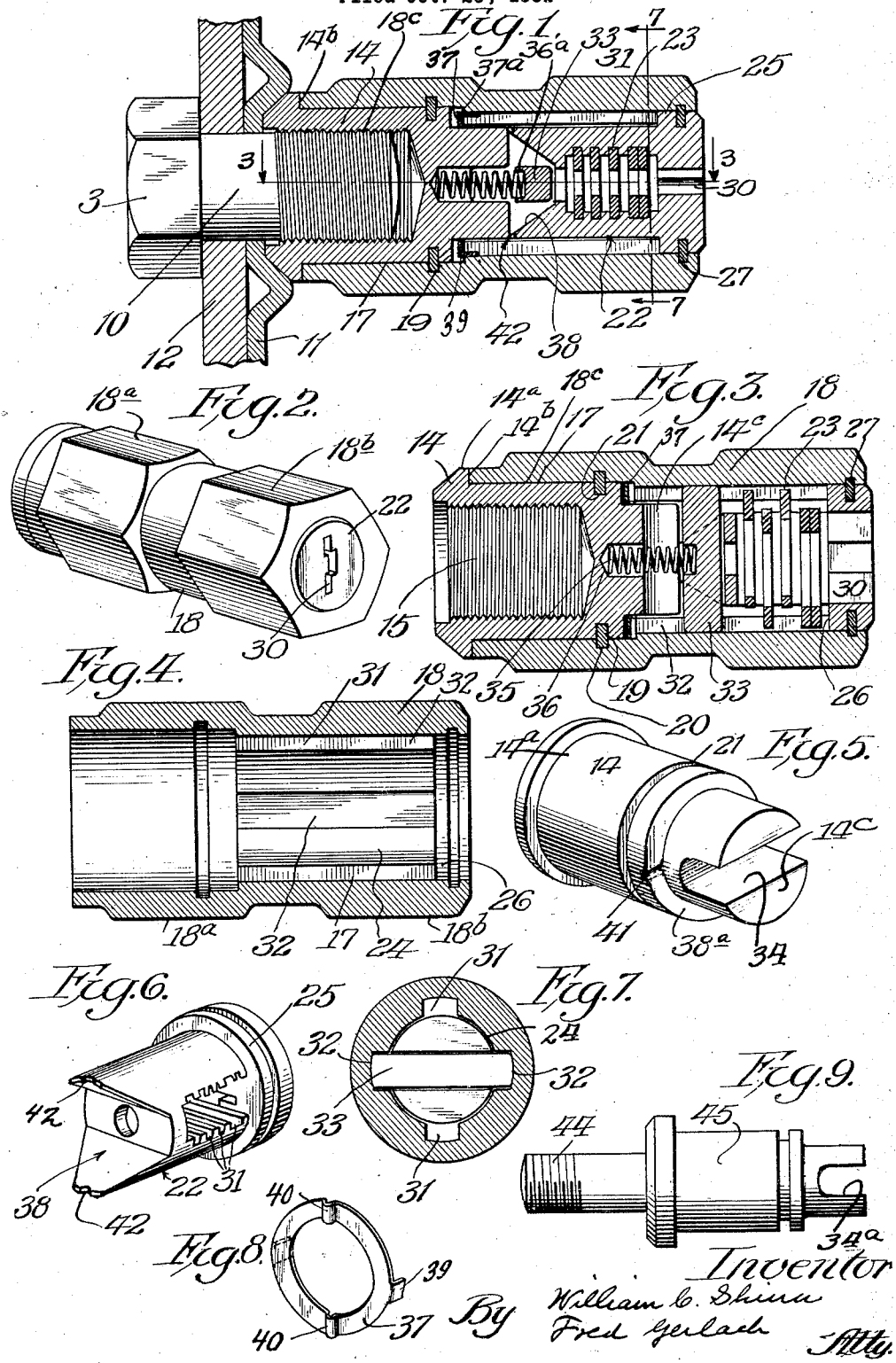
Inventor
William C. Shinn
By Fred Gerlach
Atty.

Patented Dec. 5, 1933

1,937,848

UNITED STATES PATENT OFFICE 1,937,848

LOCK FOR NUTS

William C. Shinn, Chicago, Ill., assignor to Chicago Lock Company, Chicago, Ill., a corporation of Illinois Application October 26, 1931. Serial No. 571,129

6 Claims. (Cl. 70—90)

The invention relates to locking devices for preventing the removal of securing or attaching devices, such as as nuts or bolts, to prevent theft.

One object of the invention is to provide an improved key controlled device for locking securing devices against removal, which is efficient in operation and can be manufactured at a low cost. Other objects will appear from the following detailed description.

The invention consists in the several novel features hereinafter set forth and more particularly pointed out in the claims at the conclusion hereof.

In the drawing: Fig. 1 is a section of a device embodying the invention applied to the nut of a bolt for securing a wheel against removal from the axle or spindle of an automobile. Fig. 2 is a perspective of the device. Fig. 3 is a section on the line 3—3 of Fig. 1. Fig. 4 is a longitudinal section of the sleeve of the device. Fig. 5 is a perspective of the nut of the device. Fig. 6 is a perspective of the plug which carries the key-operable tumblers. Fig. 7 is a section on the line 7—7 of Fig. 2. Fig. 8 is a perspective of the resilient ring for relatively positioning the sleeve and the nut. Fig. 9 is a side elevation of a device embodying a modified form of the invention and designed for use with a bolt.

The invention is exemplified as applied to the nut 14 of a bolt 10 which secures the hub 11 of a wheel on the flange 12 of an axle or spindle of a vehicle. The nut, in this form of the invention, exemplifies the securing device which is to be protected against rotation so the wheel cannot be stolen from the vehicle. This nut 14 has a socket 15 which is adapted to receive and enclose the threaded end of the bolt 10. The nut 14 has a cylindrical periphery 14$^a$ which fits in a cylindrical socket 18$^c$ formed in a sleeve or casing 18. A split resilient ring 19 is confined in annular grooves formed in the inner face 17 of the casing and the periphery of nut 14 to hold the sleeve and nut against relative longitudinal movement, while at the same time permitting rotation of the sleeve around the nut. An annular shoulder 14$^b$ on the sleeve fits against the inner end of the nut. The sleeve 18 has hexagonal peripheral portions 18$^a$ and 18$^b$ so a wrench can be applied to the sleeve when the nut is locked to rotate therewith, to turn the nut on or off the bolt.

A plug 22, journaled in the sleeve 18, carries a set of transversely slidable, key-operable tumblers 23. This plug has a cylindrical periphery fitting in a cylindrical bore 24 in the front portion of the sleeve 18, and an annular shoulder 25 fits in the front end of, and against a shoulder 26 in the sleeve. A split ring 27, confined in annular grooves in the plug and sleeve, holds the plug in the sleeve while permitting its rotation. A key-slot 30 is formed in the front of the plug to permit a key to be inserted to operate the tumblers 23. These tumblers are urged outwardly from the plug by suitable springs (not shown). The ends of the tumblers are adapted to pass into longitudinal grooves 31, when the plug is rotated to one of its predetermined positions in the sleeve, and into similar grooves 32 in the sleeve when the plug has been rotated to its other predetermined position. When the tumblers are held in said grooves, the plug will be locked against relative rotation in or to the sleeve 18. These grooves are disposed 90° apart.

The means for rendering the nut 14 operable by the sleeve 18, comprises a cross-bar 33 which has its ends extended into the longitudinal groove 32 in the sleeve. This bar is slidable in said grooves and held therein so it will rotate at all times with the sleeve. The nut 14 has an extension 14$^c$ disposed and fitting in the rear portion of bore 24. A cross-groove 34 is formed in the front of said extension to receive the medial portion of cross-bar 33. When the cross-bar passes into said cross-groove, the sleeve and nut will be rotatable together so the nut can be turned on or off the bolt 10 by roation of the sleeve. When the cross-bar is released from or forwardly of the nut, it will be seated, as shown in Fig. 1, against the rear end of plug 22 between rearwardly divergent cams 38 which project rearwardly from the plug, by a coil spring 35. The ends of said spring are confined in a socket 36 in the nut and a socket 36$^a$ in the rear side of the cross-bar 36. When the plug is rotated in the sleeve in which the cross-bar is held, while the cross-bar is released from the nut, cams 38 will engage the front edges of the cross-bar on the opposite side of its center and press the cross-bar into the cross-groove 34 in the nut. When the plug is turned in the sleeve while the cross-bar 32 is in the cross-groove of the nut, the spring 35 will force the bar forwardly out of the groove 34 and thus release the nut so it cannot be rotated by the sleeve. A quarter turn of the plug in the sleeve will shift the cross-bar from one of its positions to the other.

A resilient ring 37 is interposed between an annular shoulder 37$^a$ at the rear end of bore 24 and a shoulder 38$^a$ on the nut, and has tongues 39 which extend into grooves 32 in the sleeve to cause the ring to rotate with the sleeve. This ring also has ribs or beads 40 which are adapted to spring or snap into grooves 41 in the shoulder 38$^a$ on the nut, when the sleeve is rotatively positioned, so that cross-bar 33 will be aligned with and be positioned to enter cross-groove 34 in the nut. The action of this ring will indicate to the operator that the plug is properly positioned to permit the cross-bar to be locked to the nut by the cams 38, and will also frictionally hold the sleeve against rotation relatively to the nut while the plug is being rotated in the sleeve. The ends of cams 38 have notches 42 to receive the curved or beveled front side of the cross-bar 33, to retain the plug in position to keep the cross-bar in the groove 34 of the nut, while the sleeve is being turned, to turn the nut on its bolt, and to indicate to the operator when the plug has been given the necessary quarter turn for that purpose. The operator can feel when the cross-bar snaps into recesses 42.

When the nut 14 is to be tightened on the bolt 10, the key will be inserted into the plug to withdraw the tumblers from the sleeve, and thus release the plug for rotation in the sleeve. The key will then be given a quarter turn to correspondingly rotate the plug in the casing. This will cause cams 38 to slide the cross-bar 33 rearwardly into the cross-groove 34 in the nut, whereupon the nut will be rotatable by the sleeve through the bar. When the cross-bar 33 snaps into notches 42 in cams 38, the operator will know that the plug has been sufficiently rotated and the plug will be held in position to retain the bar in the nut. If desired, the key can be withdrawn from the plug, so the tumblers will enter grooves 32 and lock the plug in position to lock the cross-bar and nut together. When the nut has been tightened on the bolt, the plug will be given a quarter turn in either direction in the sleeve 18 by means of the inserted key and the key will then be withdrawn, so the plug will be locked against rotation in the sleeve and the cross-bar will be disengaged from the nut. The sleeve and plug will then be rotatable together independently of the nut and the nut cannot be turned loose by rotation of the sleeve. Should the sleeve be rotated around the nut, to bring the cross-bar 33 out of alignment with cross-groove 34 in the nut, the operator will rotate the sleeve until the ribs 40 click or snap into grooves 41 in the nut to position the cross-bar 33 so it will enter cross-groove 34 when the plug is operated by the key.

In Fig. 9 the invention is applied to a bolt 44, which has a portion 45 adapted to be held in the sleeve 18 and has a cross-groove 34ª for the cross-bar 33. The operation is the same as that previously described except the device which is rotatable by the sleeve consists of a head-portion on the bolt in lieu of a nut.

Having thus described the invention, what I claim as new and desire to secure by Letters Patent, is:

1. In a locking device of the character described, the combination of a rotatable holding device, a sleeve having the rear end thereof rotatable around said device, a plug rotatable in the front end of the sleeve and provided with key-operable means for locking the plug against rotation in the sleeve, a cross-bar longitudinally slidable in and rotatable with the sleeve and movable into interlocking relation with said device to render said device rotatable by the sleeve, a spring between the device and the cross bar for pressing the bar to release the device, and a cam on the rear end of and projecting rearwardly from the plug for shifting the cross-bar longitudinally of the sleeve into interlocking relation with said device.

2. In a locking device of the character described, the combination of a rotatable holding device, a sleeve having the rear end thereof rotatable around said device, a plug rotatable in the front end of the sleeve and provided with key-operable means for locking the plug against rotation in the sleeve, a cross-bar longitudinally slidable in and rotatable with the sleeve and movable into interlocking relation with said device to render said device rotatable by the sleeve, and divergent longitudinally extending cams formed integral with and projecting rearwardly from the rear end of the plug and arranged to shift the cross bar into interlocking relation with said device in response to rotation of the plug relative to the sleeve.

3. In a locking device of the character described, the combination of a rotatable holding device, a sleeve rotatable around said device, having longitudinal grooves on its inner periphery, a plug rotatable in the sleeve and provided with key-operable tumblers adapted to enter said grooves for locking the plug to rotate with the sleeve, a cross-bar longitudinally slidable in two of said longitudinal grooves and rotatable with the sleeve and movable into interlocking relation with the inner end of said device to render said device rotatable by the sleeve, and a cam on the plug for shifting the cross bar longitudinally of the sleeve and into interlocking relation with said device.

4. In a locking device of the character described, the combination of a rotatable holding device, a sleeve rotatable around said device, a plug rotatable in the sleeve and provided with key-operable means for locking the plug against rotation in the sleeve, a bar slidable in and rotatable with the sleeve and movable into interlocking relation with said device to render said device rotatable by the sleeve, means on the plug for shifting the cross-bar into interlocking relation with the device, and means for frictionally holding the sleeve and device against relative rotation when they are in a predetermined position.

5. In a locking device of the character described, the combination of a rotatable holding device, a sleeve rotatable around said device, a plug rotatable in the sleeve and provided with key-operable means for locking the plug against rotation in the sleeve, a bar slidable in and rotatable with the sleeve and movable into interlocking relation with said device to render said device rotatable by the sleeve, means on the plug for shifting the cross-bar into interlocking relation with the device, and means for frictionally holding the sleeve and device against relative rotation when they are in a predetermined position, comprising a resilient ring between the sleeve and the device.

6. In a locking device of the character described, the combination of a rotatable holding device, a sleeve rotatable around said device, a plug rotatable in the sleeve and provided with key-operable means for locking the plug against rotation in the sleeve, a bar slidable in and rotatable with the sleeve and movable into interlocking relation with said device to render said device rotatable by the sleeve, means on the plug for shifting the cross-bar into interlocking relation with the device, and means for frictionally holding the sleeve and device against relative rotation when they are in a predetermined position, comprising a resilient ring between the sleeve and the device and having tongues for rotating it with the sleeve.

WILLIAM C. SHINN.